United States Patent
Hahn et al.

[11] Patent Number: 6,147,021
[45] Date of Patent: Nov. 14, 2000

[54] DIELECTRIC CERAMIC COMPOSITION OF MICROWAVE MGTIO₃CATIO₃ GROUP AND DIELECTRIC CERAMIC FABRICATION METHOD USING THE SAME

[75] Inventors: Jin Woo Hahn; Duk Jun Kim; Gee Pyeong Han; Yark Yeon Kim; Sang Seok Lee; Tae Goo Choy, all of Daejeon, Rep. of Korea

[73] Assignees: Electronics and Telecommunications Research Institute, Daejon; Korea Telecom, Seoul, both of Rep. of Korea

[21] Appl. No.: 09/186,899

[22] Filed: Nov. 6, 1998

[30] Foreign Application Priority Data

Sep. 11, 1998 [KR] Rep. of Korea ............... 98-37616

[51] Int. Cl.⁷ .................................................. C04B 35/465
[52] U.S. Cl. ............................................................ 501/136
[58] Field of Search ............................................... 501/136

[56] References Cited

U.S. PATENT DOCUMENTS

| | | | |
|---|---|---|---|
| 4,242,213 | 12/1980 | Tamura et al. | |
| 4,845,062 | 7/1989 | Burn | |
| 5,340,784 | 8/1994 | Katoh et al. | |
| 5,401,702 | 3/1995 | Kim et al. | 501/136 |
| 5,444,028 | 8/1995 | Takahashi et al. | 501/136 |
| 5,616,528 | 4/1997 | Toda et al. | 501/136 |

OTHER PUBLICATIONS

V.M. Ferreira et al., "Loss Spectra of Pure and La–doped MgTiO₃ Microwave ceramics", 1995 Materials Research Society, vol. 10, No. 9, Sep. 1995, pp. 2301–2305.

Victor M. Ferreira et al., "Role of Niobium in Magnesium Titanate Microwave Dielectric Ceramics", Communications of the American Ceramic Society, vol. 79, No. 6, pp. 1697–1698.

V.M. Ferreira et al., "The Effect of Cr and La on MgTiO₃ and MgTiO₃–CaTiO₃ Microwave Dielectric Ceramics", 1997 Materials Research Society, vol. 12, No. 12, Dec. 1997, pp. 3293–3299.

*Primary Examiner*—Karl Group
*Attorney, Agent, or Firm*—Jacobson, Price, Holman & Stern, PLLC

[57] ABSTRACT

A dielectric ceramic composition for a microwave device including $MgTiO_3$ and $CaTiO_3$ as a main component and a $Li_2CO_3$ as a sub-component is provided. The composition being expressed as follows: $(94MgTiO_3\text{-}6CaTiO_3)+x\ Li_2CO_3(\text{mol }\%)$, where $0.2 \leq x \leq 0.8$ (mol %). Therefore, it is capable of increasing a quality factor and decreasing a sintering temperature by adding a new component and effectively reproducing the above-described dielectric characteristic.

2 Claims, No Drawings

DIELECTRIC CERAMIC COMPOSITION OF MICROWAVE MGTIO$_3$CATIO$_3$ GROUP AND DIELECTRIC CERAMIC FABRICATION METHOD USING THE SAME

BACKGROUND OF THE INVENTION

1. Field of the Invention

The present invention relates to a dielectric ceramic composition of MgTiO$_3$-CaTiO$_3$ group for microwave application and a dielectric ceramic fabrication method using the same, and in particular, to an improved dielectric ceramic composition of MgTiO$_3$-CaTiO$_3$ group and a dielectric ceramic fabrication method using the same which are used for passive components in microwave range and have a high quality factor and an excellent temperature stability.

2. Description of the Conventional Art

As various communication devices are advanced, the products adapting such devices are made to have a high quality and to be compact. In order to meet these trends, various components for an information communication device are required to have a high quality and to be compact. Therefore, a demand for a new material having better properties as well as good design of the components is increased. In particular, since it is expected that the development of the passive part such as a band pass filter or duplexer using a dielectric ceramic meets the demand for a compact and low electric power consumption and high performed product, the research and development for various dielectric ceramic materials having such excellent characteristics have been widely developed.

The MgTiO$_3$-CaTiO$_3$ compound is a dielectric ceramic capable of variably controlling a dielectric characteristic depending on the composition ratio of two components. A method is known to add various additives to the dielectric ceramic for controlling a dielectric characteristic and a sintering characteristic (for example, U.S. Pat. Ser. No. 5,340,784 and U.S. Pat. Ser. No. 4,242,213). The method is known to add some oxide materials or to substitute an element of a lanthanum series with Ca for thereby enhancing a dielectric characteristic of the dielectric. As a result, it is possible to obtain a dielectric material having a dielectric constant $\epsilon_r$ of about 20 and a temperature coefficient of resonant frequency $\tau_f$ of within ±10 ppm/° C. However, in view of the quality factor Q and sintering temperature, it is impossible to obtain a desired result.

Generally, the dielectric ceramic materials should have a high dielectric constant and quality factor and a stable temperature characteristic. In order to obtain the above-described material characteristic, a new additive is required to be added, and also controlling the microstructure and improvement of the fabrication processes are necessary.

SUMMARY OF THE INVENTION

Accordingly, it is an object of the present invention to provide a dielectric ceramic composition of MgTiO$_3$-CaTiO$_3$ group for microwave applications and a dielectric ceramic fabrication method using the same which overcome the aforementioned problems encountered in the conventional art.

It is another object of the present invention to provide a dielectric ceramic composition of MgTiO$_3$-CaTiO$_3$ group and a dielectric ceramic fabrication method using the same which are capable of enhancing dielectric characteristics of a MgTiO$_3$-CaTiO$_3$ group dielectric material used in the microwave frequency range.

It is another object of the present invention to provide a dielectric ceramic composition of a microwave MgTiO$_3$-CaTiO$_3$ group and a dielectric ceramic fabrication method using the same which are capable of increasing a quality factor and decreasing a sintering temperature by adding a new component and effectively reproducing the above-described dielectric characteristic.

In order to achieve the above objects, there is provided a dielectric ceramic composition for a microwave device including MgTiO$_3$ and CaTiO$_3$ as a main component and a Li$_2$CO$_3$ as a sub-component, the composition being expressed as follows:

(Composition equation)

$$(94\text{MgTiO}_3\text{-}6\text{CaTiO}_3)+x\text{Li}_2\text{CO}_3 \text{ (mol \%)}$$

where $0.2 \leq x \leq 0.8$ (mol %).

In order to achieve the above objects, there is provided a dielectric ceramic composition for a microwave device including MgTiO$_3$ and CaTiO$_3$ as a main component and a Li$_2$CO$_3$ and MgO as a sub-component, the composition being expressed as follows:

(Composition equation)

$$(94\text{MgTiO}_3\text{-}6\text{CaTiO}_3)+x\text{Li}_2\text{CO}_3+y\text{MgO} \text{ (mol \%)}$$

where $0.2 \leq x \leq 0.4$ (mol %), and $0 < y \leq 6$ (mol %).

In order to achieve the above objects, there is provided a microwave device dielectric ceramic fabrication method for measuring MgO, CaCO$_3$, TiO$_3$ and Li$_2$CO$_3$ as a starting material based on the following microwave device dielectric ceramic composition equation in which MgTiO$_3$ and CaTiO$_3$ are used as a main component and a Li$_2$CO$_3$ is used as a sub-component, overly adding Li$_2$CO$_{31}$ mixing and milling a resultant mixture, and fabricating a microwave device dielectric ceramic through a calcination process and molding and sintering process based on the following composition equation:

$$(94\text{MgTiO}_3\text{-}6\text{CaTiO}_3)+x\text{Li}_2\text{CO}_3 \text{ (mol \%)}$$

where $0.2 \leq x \leq 0.8$ (mol %).

In order to achieve the above objects, there is provided a microwave device dielectric ceramic fabrication method for measuring MgO, CaCO$_3$, TiO$_3$ and Li$_2$CO$_3$ as a starting material based on the following microwave device dielectric ceramic composition equation in which MgTiO$_3$ and CaTiO$_3$ are used as a main component and a Li$_2$CO$_3$ and MgO are used as a sub-component, overly adding Li$_2$CO$_3$ and MgO, mixing and milling a resultant mixture, and fabricating a microwave device dielectric ceramic through a calcination process and molding and sintering process based on the following composition equation:

$$(94\text{MgTiO}_3\text{-}6\text{CaTiO}_3)+x\text{Li}_2\text{CO}_3+y\text{MgO} \text{ (mol \%)}$$

where $0.2 \leq x \leq 0.8$ (mol %), and $0 < y \leq 6$ (mol %).

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

DETAILED DESCRIPTION OF THE INVENTION

In the present invention, a small amount of sub-compositions such as $Li_2CO_3$ and MgO are added to the main composition of $MaTiO_3$ and $CaTiO_3$ for producing a new dielectric ceramic composition. Namely, the present invention is directed to providing a process variables for each fabrication processes and a fabrication method for obtaining the above-described dielectric characteristics.

The required dielectric characteristics of a dielectric material used in the microwave frequency range are as follows:

First, the dielectric constant should be high for decreasing the size of part,

Second, the dielectric loss of a material should be low for minimizing the insertion loss of the part (namely, the quality factor should be high), and Third, the variation of the dielectric characteristics with respect to the temperature should be small for implementing a temperature stable characteristic of the part (for example, the temperature coefficient of the resonant frequency should be near zero (0)).

The above-described three characteristics are independent to each other, so that it is difficult to meet all of three characteristics. In particular, it is known that the dielectric constant and the quality factor of the material are inversely proportional. Namely, the material having a high dielectric constant has a small quality factor (namely, the dielectric loss is high), and on the contrary, the material having a small dielectric constant has a large quality factor. Therefore, it is difficult to obtain a material having the above-described desired characteristics of the dielectric constant and quality factor. Therefore, it is needed to seek a proper compromise between two characteristics. In addition, in this case, the third characteristic that the temperature characteristic of the material should be stable should be obtained. Actually, it is very hard to obtain a material meeting the above-described three characteristics.

The $MgTiO_3$-$CaTiO_3$ group material among the known microwave dielectric materials is a material capable of controlling the dielectric characteristic in accordance with the mixing ratio of the two components. $MgTiO_3$ is a material having a dielectric constant of about 17, a quality factor ($Qxf_0$) of about 110,000 and a temperature coefficient of resonant frequency($\tau_f$) of −45 ppm/° C. In addition, $CaTiO_3$ is a material having a dielectric constant of about 170, a quality factor ($Qxf_0$) of about 9,000 and a temperature coefficient of resonant frequency ($\tau_f$) of +800 ppm/° C. The above-described two materials have the opposite dielectric characteristics and also different crystal structure. Therefore, the dielectric material fabricated by combining the above-described two materials is a 2-phase mixture. The dielectric characteristic of the mixture has an intermediate value of the dielectric characteristic in accordance with the mixing ratio of two materials based on a mixing rule.

In particular, the material combined at a ratio of $MgTiO_3$:$CaTiO_3$=94:6 has a temperature coefficient of resonant frequency of 0, a dielectric constant ($\epsilon_r$) of about 20, and a quality factor ($Qxf_0$) of about 50,000~60,000.

In the present invention, the dielectric material ceramic compound combined at a ratio of $MgTiO_3$:$CaTiO_3$=94:6 is used as a basic composition, and $Li_2CO_3$ and MgO are added thereto for thereby enhancing the quality factor of the dielectric material (namely, decreasing the dielectric loss), decreasing the sintering temperature, and producing a material having an excellent dielectric characteristics based on the low temperature sintering process. Since the lithium compound generally has a low melting temperature, it may be used as a sintering additives. Therefore, sintering is implemented at a relatively low temperature.

On the other hand, MgO which is an another sub-composition is known to well absorb $CO_2$ and moisture from the surrounding air. Therefore, MgO should be handled carefully. When weighing the raw material the possibility of weight increase due to the adsorption should be considered. Namely, MgO may be actually added less than the necessary amount. In order to compensate the above-described problem, a little amount of MgO is added in excess. In addition, adding MgO in excess, it is possible to prevent an abnormal grain growth which is usually observed in $MgTiO_3$ for thereby decreasing the dielectric loss.

In order to fabricate $MgTiO_3$ and $CaTiO_3$ based on MgO, $CaCO_3$, $TiO_2$ and sub-composition material powder, the above-described powders are mixed at a predetermined composition ratio and phase synthesis is attempted through a calcination process. At this time, the calcination process is performed at a temperature of 900~1000° C. for 2 hours. The powder after the calcination process is pressed using a cylindrical mold and then is sintered at a proper temperature for thereby obtaining a dielectric ceramic material. In this process, the dielectric characteristics of the sintered material obtained at each sintering temperature are different. In order to obtain a $MgTiO_3$-$CaTiO_3$ group dielectric ceramic having an excellent characteristic, the sintering process is performed at a temperature of 1100~1250° C. for 2~4 hours.

The examples of the present invention will be explained in detail.

EXAMPLE 1

The composition equation used in the example 1 of the present invention is as follows:

Composition equation 1

$$(94MgTiO_3\text{-}6CaTiO_3)+xLi_2CO_3 \text{ (mol \%)}$$

where $0.2 \leq x \leq 0.8$ (mol %)

99 or 99.9% purity of MgO, $CaCO_3$, $TiO_2$, $Li_2CO_3$ (from a high purity chemicals Lab., Japan) are selected as a starting material, and each material powder is weighed in accordance with the mole ratio of $MgTiO_3$:$CaTiO_3$=94:6, and 0.2~0.8 mol % of $Li_2CO_3$ is overly added thereto.

At this time, if the value x is decreased below 0.2 mol %, the adding effect of Li disappears. Namely, since the adding effect of Li disappears when x is 0.1 based on the Table 1 (the amount of Li is indicated as 0.2 mol %), the value x should be larger than or equal to minimum 0.2. However, if Li is overly added ($x \geq 0.8$ mol %), namely, as shown in Table 1, the value x is 1.0, the dielectric characteristic is decreased. Therefore, the adding amount of $Li_2CO_3$ should be in the range of $0.2 \leq x \leq 0.8$ (mol %).

The thusly weighed source material powder was inserted into a polyethylene bottle and then is wet-milled for 20 hours using zirconia balls and distilled water, and then was dryed. The dryed powder was calcinated at a temperature of 900~1000° C. for 2 hours and was sieved using a No. 100 sieve. Small amount of distilled water instead of organic binder was added for thereby preparing a desired powder.

From the result of the XRD analysis, the calcinated powder was confirmed as $MgTiO_3$ and $CaTiO_3$. The powder prepared through the calcination process was provided into a cylindrical mold and was pressed at a pressure of about 1000 kg/cm², and the pressed sample having a diameter of 12 mm and a height of about 6 mm was fabricated based on a CIP at a pressure of about 2500 kg/cm$_2$. The molded samples of each composition were sintered at a temperature of 1100~1400° C. for 2~4 hours, and then the sintering density and the dielectric characteristic were measured. The resultant values of the above-described process are shown in the following Table 1.

TABLE 1

The sintering and dielectric characteristic of (94 MgTiO$_3$-6CaTiO$_3$) + Li

| Amount of Li | Sintering condition (Temp/Hr) | Sintering Density (g/cm$_3$) | Dielectric Constant ($\epsilon_r$) | Quality factor (Qxf$_0$, GHz) | Temp. Coefficient of resonant frequency ($\tau_f$, ppm/° C.) |
|---|---|---|---|---|---|
| 0.2 mol % | 1200/2 | 3.77 | 21.9 | 53,700 | +5.24 |
| " | 1225/2 | 3.83 | 21.7 | 61,900 | |
| " | 1250/2 | 3.83 | 21.6 | 64,700 | +4.51 |
| " | 1300/2 | 3.82 | 21.4 | 60,200 | +3.97 |
| 0.4 mol % | 1125/4 | 3.78 | 21.3 | 72,700 | |
| " | 1150/4 | 3.83 | 21.7 | 75,200 | +6.74 |
| " | 1175/4 | 3.84 | 21.5 | 77,500 | +4.88 |
| " | 1200/4 | 3.85 | 21.7 | 74,200 | +3.02 |
| " | 1225/4 | 3.85 | 21.6 | 73,700 | +0.33 |
| " | 1250/4 | 3.84 | 21.3 | 70,200 | −0.57 |
| " | 1300/4 | 3.52 | 18.4 | 87,800 | |
| " | 1325/4 | 3.64 | 19.3 | 87,400 | |
| " | 1350/4 | 3.71 | 20.0 | 81,500 | |
| " | 1400/4 | 3.80 | 20.7 | 75,900 | |
| 0.8 mol % | 1175/4 | 3.81 | 21.4 | 71,800 | +3.86 |
| " | 1200/4 | 3.83 | 21.7 | 70,300 | +1.75 |
| " | 1200/2 | 3.83 | 21.7 | 69,800 | +2.13 |
| " | 1250/2 | 3.82 | 21.5 | 65,800 | |
| " | 1300/4 | 3.49 | 18.3 | 84,300 | |
| " | 1325/4 | 3.61 | 19.0 | 89,700 | +6.35 |
| " | 1350/4 | 3.71 | 19.8 | 89,200 | |
| " | 1400/4 | 3.81 | 20.4 | 77,600 | |
| 1.2 mol % | 1125/4 | 3.78 | 21.5 | 72,200 | |
| " | 1150/4 | 3.82 | 21.5 | 74,900 | +7.44 |
| " | 1175/4 | 3.84 | 21.5 | 71,700 | +2.02 |
| " | 1200/4 | 3.84 | 21.5 | 72,500 | +1.48 |
| " | 1225/4 | 3.84 | 21.8 | 70,800 | −0.39 |
| " | 1250/4 | 3.84 | 21.4 | 66,200 | −1.42 |
| 1.6 mol % | 1175/4 | 3.79 | 21.5 | 68,200 | |
| " | 1200/4 | 3.81 | 21.3 | 66,300 | +4.24 |
| " | 1200/2 | 3.81 | 21.2 | 65,400 | |
| " | 1250/2 | 3.80 | 21.4 | 61,500 | |
| 2.0 mol % | 1175/4 | 3.76 | 21.2 | 62,200 | |
| " | 1200/4 | 3.78 | 21.1 | 60,500 | +7.43 |
| " | 1200/2 | 3.78 | 21.1 | 58,700 | +8.27 |
| " | 1250/2 | 3.77 | 21.2 | 55,500 | +5.15 |

The quality factor of the dielectric material was measured in frequency range of 5~7 GHz. As shown in the above Table 1, the quality factor (Qxf$_0$) of the Li-added MgTiO$_3$-CaTiO$_3$ dielectric material has an excellent value compared to the conventional value and it has a sintering temperature of 1100~1200° C. In addition, the optimum adding amount of Li was 0.4~1.6 mol % identical to the amount of Li shown in Table 1 (In the composition equation 1, 0.2≦x≦0.8).

Therefore, Li was used as a sub-composition for enhancing a sintering characteristic and a dielectric characteristic. In addition, the dielectric constant was not varied in accordance with the sintering temperature with respect to the adding amount of Li, however the quality factor was sensitively varied. In order to obtain the dielectric material of the high quality factor, an optimum sintering condition is necessary.

EXAMPLE 2

The composition equation 2 used in the example 2 of the present invention is as follows:

Composition equation 2

(94MgTiO$_3$-6CaTiO$_3$)+xLi$_2$CO$_3$+yMgO (mol %)

where 0.2≦x≦0.4 (mol %)
0<y≦6 (mol %)

In the example 2, 99 or 99.9% purity of MgO, CaCO$_3$, TiO$_2$, Li$_2$CO$_3$ (from a high purity chemicals Lab., Japan) are selected as starting materials, and each material powder is weighed in accordance with the mole ratio of MgTiO$_3$:CaTiO$_3$=94:6, and Li$_2$CO$_3$ and MgO are added thereto. At this time, 0.2~0.4 mol % of Li$_2$CO$_3$ and MgO of y of about 6 mol % are overly added thereto. The succeeding processes are the same as the example 1 of the present invention. The sintering density and the dielectric characteristics of the thusly fabricated dielectric material are measured and are shown in Tables 2, 3 and 4.

TABLE 2

The sintering and dielectric characteristics of (94MgTiO$_3$-6CaTiO$_3$) + 3Mg + Li

| Amount of Li | Sintering Condition (Temp/Hr) | Sintering density (g/cm$^3$) | Dielectric constant ($\epsilon_r$) | Quality factor (Qxf$_0$, GHz) |
|---|---|---|---|---|
| 0.4 mol % | 1275/2 | 3.45 | 17.2 | 65,200 |
| | 1300/2 | 3.42 | 17.1 | 71,700 |
| | 1325/2 | 3.58 | 18.9 | 81,600 |
| | 1350/2 | 3.72 | 20.2 | 75,800 |
| 0.8 mol % | 1250/2 | 3.67 | 19.29 | 79,000 |
| | 1275/2 | 3.54 | 18.53 | 83,900 |
| | 1300/2 | 3.63 | 19.55 | 81,500 |
| | 1325/2 | 3.74 | 20.25 | 80,000 |

TABLE 3

The sintering and dielectric characteristics of (94MgTiO$_3$-6CaTiO$_3$) + 6Mg + Li

| Amount of Li | Sintering Condition (Temp/Hr) | Sintering density (g/cm$^3$) | Dielectric constant ($\epsilon_r$) | Quality factor (Qxf$_0$, GHz) |
|---|---|---|---|---|
| 0.4 mol % | 1300/2 | 3.50 | 18.1 | 91,800 |
| " | 1325/2 | 3.61 | 19.1 | 84,600 |
| " | 1350/2 | 3.72 | 19.7 | 77,100 |
| " | 1375/2 | 3.83 | 21.1 | 73,400 |
| " | 1400/2 | 3.80 | 20.3 | 76,200 |
| " | 1300/4 | 3.57 | 18.4 | 89,300 |
| " | 1325/4 | 3.68 | 19.5 | 89,200 |
| " | 1350/4 | 3.74 | 20.2 | 82,900 |
| " | 1400/4 | 3.79 | 20.3 | 77,700 |
| 0.8 mol % | 1300/2 | 3.40 | 17.5 | 35,600 |
| " | 1325/2 | 3.54 | 18.6 | 88,600 |
| " | 1350/2 | 3.67 | 19.3 | 82,300 |
| " | 1375/2 | 3.79 | 20.7 | 72,000 |
| " | 1400/2 | 3.79 | 20.5 | 75,400 |
| " | 1275/4 | 3.39 | 17.4 | 37,400 |
| " | 1300/4 | 3.52 | 18.2 | 84,300 |
| " | 1325/4 | 3.63 | 19.3 | 88,000 |
| " | 1350/4 | 3.72 | 19.8 | 83,700 |
| " | 1400/4 | 3.79 | 20.3 | 77,000 |

TABLE 4

The sintering and dielectric characteristics of $(94MgTiO_3\text{-}6CaTiO_3) + 9Mg + Li$

| Amount of Li | Sintering Condition (Temp/Hr) | Sintering density (g/cm³) | Dielectric constant ($\epsilon_r$) | Quality factor ($Qxf_0$, GHz) |
|---|---|---|---|---|
| 0.4 mol % | 1275/2 | 3.28 | 16.2 | 17,400 |
| | 1300/2 | 3.45 | 17.6 | 52,800 |
| | 1325/2 | 3.62 | 19.1 | 78,800 |
| | 1350/2 | 3.74 | 20.1 | 71,800 |
| 0.8 mol % | 1250/2 | 3.68 | 19.15 | 71,200 |
| | 1275/2 | 3.58 | 18.64 | 73,900 |
| | 1300/2 | 3.66 | 19.42 | 69,500 |
| | 1325/2 | 3.75 | 20.09 | 68,800 |

The $MgTiO_3$-$CaTiO_3$ dielectric material ceramic containing Mg had a decreased dielectric constant compared to the result shown in Table 1 and an increased quality factor. In addition, the optimum amount (value of y) of Mg overly added based on the results shown in Tables 2, 3 and 4 is below 6 mol %. Namely, the values is in $0<y\leq 6$ based on the composition equation 2.

The dielectric ceramic composition and a dielectric ceramic fabrication method using the same in which Li and Mg are overly added based on $MgTiO_3$-$CaTiO_3$ have the following effects.

In the present invention, an excellent dielectric ceramic having a dielectric constant ($\epsilon_r$) Of 19~21, a quality factor ($Qxf_0$) of 70,000~90,000 and a temperature coefficient of resonant frequency($\tau_f$) of ±5 ppm/° C. is obtained based on a low temperature sintering process (1100~1250° C.).

In addition, the thusly fabricated dielectric ceramic may be used for passive components, for example, as a basic material for a band pass filter, a duplexer, etc., which are used in a microwave frequency range.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A dielectric ceramic composition for a microwave device including $MgTiO_3$ and $CaTiO_3$ as a main component and a $Li_2Co_3$ as a sub-component, said composition being sintered at a temperature of 1100 to 1250° C., and said composition being expressed as follows:

(Composition equation)

$$(94MgTiO_3\text{-}6CaTiO_3)+xLi_2CO_3 \text{ (Mol \%)}$$

wherein x lies within a range of $0.2\leq x\leq 0.4$ (mol %), and $Li_2CO_3$ of x mole % is added in excess to the main composition.

2. A dielectric ceramic composition for a microwave device including $MgTiO_3$ and $CaTiO_3$ as a main component and a $Li_2CO_3$ and MgO as a sub-component, said composition being sintered at a temperature of 1100 to 1250° C., and said composition being expressed as follows:

(Composition equation)

$$(94MgTiO_3\text{-}6CaTiO_3)+xLi_2CO_3+yMgO \text{ (mol \%)}$$

wherein x and V lies within a range of $0.2\leq x\leq 0.4$ (mol %), $0<y\leq 6$ (mol %), and $Li_2CO_3$ of x mol % and MgO of y mol % are added in excess to the main composition simultaneously.

* * * * *